J. Anderson.
Shield for Horses.

No. 92,142.    Patented Jul. 6, 1869.

Witnesses
Wm. H. Ommmeyer
Arthur B. Williams

Inventor
John Anderson

JOHN ANDERSON, OF BROOKLYN, NEW YORK.

Letters Patent No. 92,142, dated July 6, 1869.

IMPROVEMENT IN SHIELD FOR PROTECTING HORSES FROM SUNSTROKE.

The Schedule referred to in these Letters Patent and making part of the same.

*To all whom it may concern:*

Be it known that I, JOHN ANDERSON, of Brooklyn, Kings county, and State of New York, have invented a new and useful or improved Shield for Protecting Horses from Sunstroke; and do hereby declare that the following is a general description thereof, reference being had to the accompanying drawings, making part of this specification.

This invention, relating to a shield for protecting horses from sunstroke, consists of a frame-work, covered with cloth, which is placed on top of a horse's head, having apertures, through which the horse's ears protrude, and attached to the bridle in any proper manner, leaving space between the head and the shield for a current of air, by means of which the poll, or upper portion of the head is protected, and the horse rendered comparatively safe and comfortable while exposed to the heat of the sun.

In the said drawings—

Figure 1:
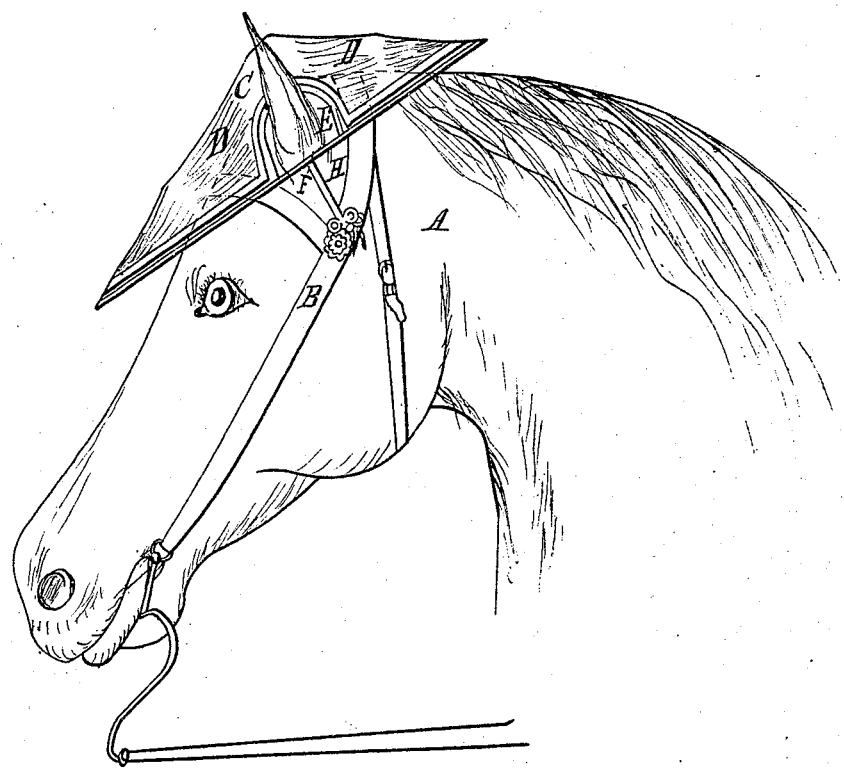
Figure 2:
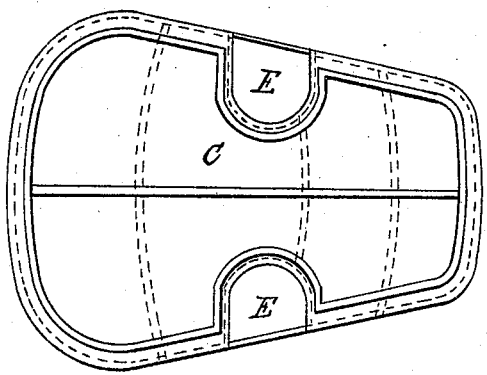

Figure 1 represents my improved shield placed on top of the head, fastened to the bridle, and forming, with the bridle, the head-gear of the horse;

Figure 2, a top view of the shield; and

Figure 3:
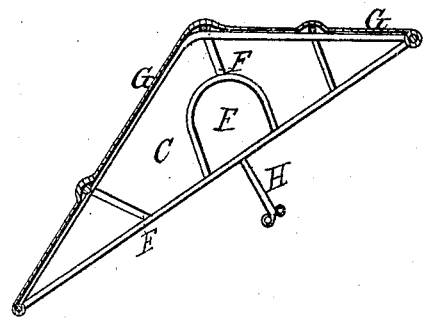

Figure 3, a vertical section of same.

A indicates the head and neck of a horse, and B, the bridle.

C is the shield, placed on top of the head, projecting in front over the forehead, and back over and covering the junction of the cerebellum, or little brain, with the spinal marrow, which lies near the surface, and is quickly affected by the heat of the sun.

D is the air-space between the head and shield, and

E E are the apertures in the shield, through which the horse's ears protrude.

This shield is composed of a wire, wooden, or other suitable frame-work, F, which is covered with cloth, G, in a proper manner, and having two arms, H H, projecting from the frame, for attaching the shield to the bridle, as shown in fig. 1.

Having described my invention,

What I claim, and desire to secure by Letters Patent, is—

As a new article of manufacture, the shield, or horse-bonnet C, provided with apertures E, as shown and described, and for the purpose set forth.

In testimony whereof, I have hereunto set my signature, this      day of April, A. D. 1869.

JOHN ANDERSON.

Witnesses:
 WM. H. CAMMEYER,
 ARTHUR B. WILLIAMS.